No. 868,554.

PATENTED OCT. 15, 1907.

W. H. HAMILTON.
LAWN TRIMMER.
APPLICATION FILED APR. 18, 1907.

UNITED STATES PATENT OFFICE.

WILLIAM H. HAMILTON, OF DE KALB, ILLINOIS, ASSIGNOR OF ONE-HALF TO H. B. HOYT, OF DE KALB, ILLINOIS.

LAWN-TRIMMER.

No. 868,554.

Specification of Letters Patent.

Patented Oct. 15, 1907.

Application filed April 18, 1907. Serial No. 368,840.

*To all whom it may concern:*

Be it known that I, WILLIAM H. HAMILTON, a citizen of the United States, residing at De Kalb, in the county of Dekalb and State of Illinois, have invented certain new and useful Improvements in Lawn-Trimmers, of which the following is a specification.

Figure 1:
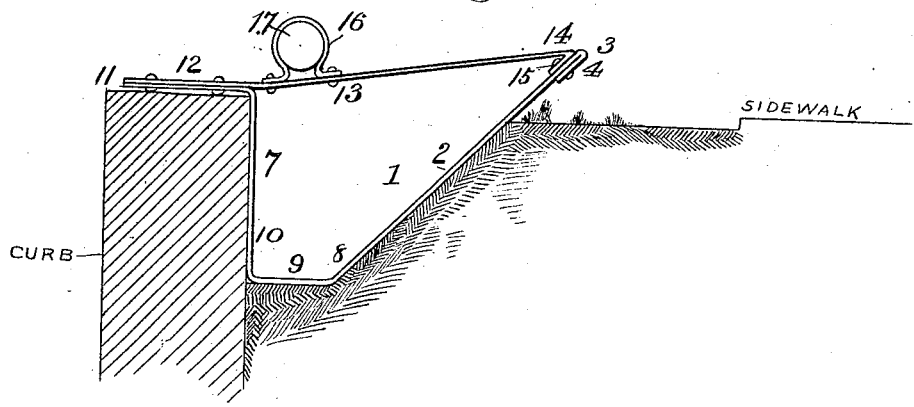
Figure 2:
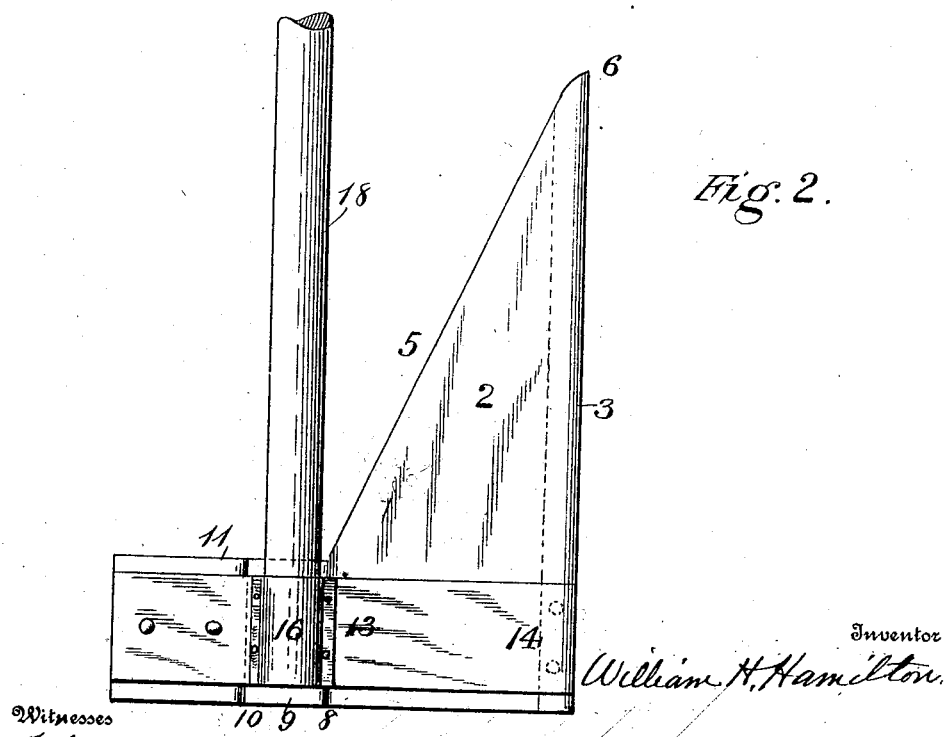

This invention relates to a new and useful improvement in lawn trimmers, and consists in the construction hereinafter pointed out.
In the annexed drawings: Figure 1 represents an end view of the device in place for use. Fig. 2, a top or plan view.

In these drawings: the numeral 1 is the body of the trimmer. This body 1 has an elongated side 2 with the edge 3 turned over at 4 to strengthen it and the oblique cutting edge 5, the side 2 terminating in a point 6 where the two edges 3 and 5 meet. The body 1 also has a narrow strip 7 extending laterally from the rear 8 of the side 2. The side 2 is made inclined to the strip 7.
This strip 7 has a bottom piece 9 and extending up therefrom a vertical piece 10 and extending therefrom outwardly a horizontal piece 11. The side 2 and strip 7 may be made in one piece cut out and stamped into proper shape.
Secured to the horizontal piece 11 of the strips 7 is one end 12 of a brace 13, the other end 14 of which has the turned down extremity 15 by which the brace 13 is secured to the edge 3 of the side 2. The brace 13 has a socket 16 for the end 17 of an operative handle 18.
This device is designed primarily for use in trimming the edges of lawns or grass plots where the long grass falls over a walk or curb and which the ordinary cutter cannot cut.

The device is put into position as shown in Fig. 1. The horizontal piece 11 forms a rest or bearing which is placed upon the top of the curb or walk, as the case may be, and the bottom 9 of the device rests upon the grass plot just alongside of the curb or walk. By drawing the trimmer in the direction of the free end of the handle 18 and pressing firmly downward on the cutter, the edge 5 makes a draw cut against the grass cutting the latter and the lower part of the device acts as a scoop to channel the ground slightly at the edge or side of the curb or walk. Thus the long edge grass is removed and at the same time a slight channel is made to permit the flow of water along the same.

Having described my invention, what I claim is:

1. A lawn trimmer, consisting of a body having a cutting side, a strip extending laterally therefrom and made with a bottom piece and a horizontal piece, the latter forming a rest, and a brace connected to the cutting side and the horizontal piece and having a handle socket.

2. A lawn trimmer, consisting of the body having the cutting side with the oblique cutting edge, the rest, the connection between the rest and the cutting side, the brace extending from the rest to the cutting side and connecting the two and the handle socket.

3. A lawn trimmer, consisting of the body 1 having the cutting side 2, the strip 7 extending laterally from the side 2 and consisting of the bottom piece 9, the vertical piece 10 and the horizontal piece 11, and the brace 13 secured to the horizontal piece 11 and the side 2, and having the handle socket 16.

In testimony whereof I have signed my name to this specification in the presence of two subscribing witnesses.

WILLIAM H. HAMILTON.

Witnesses:
S. M. HUNT,
W. C. GLIDDEN.